Nov. 16, 1965  S. J. RHODES  3,218,020
RESILIENT SEAT MOUNTING
Filed March 16, 1964  2 Sheets-Sheet 1

INVENTOR.
SAMMY J. RHODES
BY
*Fryer and Zimnwold*
ATTORNEYS

Nov. 16, 1965  S. J. RHODES  3,218,020
RESILIENT SEAT MOUNTING
Filed March 16, 1964  2 Sheets-Sheet 2
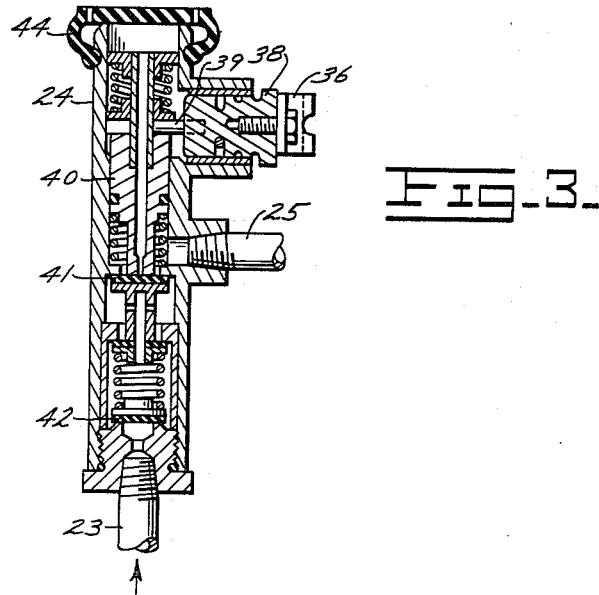
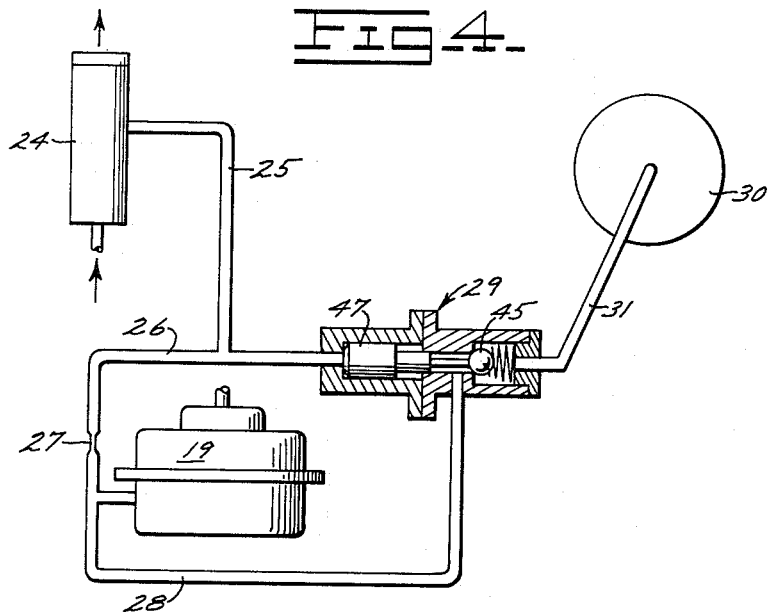
INVENTOR.
SAMMY J. RHODES
BY
*Fryer and Zimrold*
ATTORNEYS

United States Patent Office 3,218,020
Patented Nov. 16, 1965

3,218,020
RESILIENT SEAT MOUNTING
Sammy J. Rhodes, Decatur, Ill., assignor to Caterpillar Tractor Co., Peoria, Ill., a corporation of California
Filed Mar. 16, 1964, Ser. No. 352,233
4 Claims. (Cl. 248—401)

The invention is for an improvement on the structure shown in my assignee's copending application to Carter et al. for "Resilient Suspension for a Vehicle Seat," Serial No. 166,864, filed January 17, 1962, and now become Patent No. 3,150,855, granted September 29, 1964.

This invention relates to a resilient seat mounting of the kind employed on heavy duty trucks and earthmoving machinery wherein cushioning is effected by air under pressure in cylinders or air springs.

The seat of said application is supported on parallel linkage which permits vertical movement. Beneath the seat the piston rod of an air cylinder limits and cushions downward movement. Since space for the air cylinder is limited and a large quantity of air is required to obtain a desired cushioning or air spring rate, a tank or accumulator is included in circuit with the cylinder in a manner to obtain the cushioning effect of the air in both. A leveling valve controls flow from a source under pressure and controls venting of pressure from the cylinder. This valve is operatively connected to the seat so that downward movement caused by imposition of an operator's weight opens the valve to admit air to the cylinder and accumulator to a pressure valve that supports the operator at a desired level. When the operator leaves the seat, the pressure in the cylinder and accumulator tend to move the seat upwardly and its upward movement adjusts the valve to a position in which it vents the cylinder to prevent upward movement. However, the air under pressure in the accumulator also tends to vent and flows into the cylinder at greater than the venting speed of the cylinder. This causes continued rising of the seat until all of the pressure in the accumulator has exhausted and also causes a waste of the accumulator pressure. To prevent this, the device of said above mentioned application included a manually actuated valve between the cylinder and the accumulator. It was intended that each time an operator left the seat he first closed this valve to trap the pressure so that only the small quantity of air in the cylinder need be vented. If an operator were required to leave the seat in haste, or simply forget to close the valve, the seat would in effect follow him up and has been known in a few instances to pin him to the steering wheel of the vehicle.

It is the object of the present invention to overcome the disadvantages referred to above, and more specifically to provide means in the type of seat mounting and cushioning device above described for automatically closing communication between the accumulator and the air cylinder when weight is removed and the seat commences to move upwardly.

Further and more specific objects and advantages of the invention are made apparent in the following specification wherein the invention is described in detail by reference to the accompanying drawings.

In the drawings:

FIG. 3 is a sectional view of a leveling valve employed in connection with the resilient seat mounting of the present invention; and FIG. 4 is a schematic view of the pneumatic circuit involved in the present invention.

Figure 1:
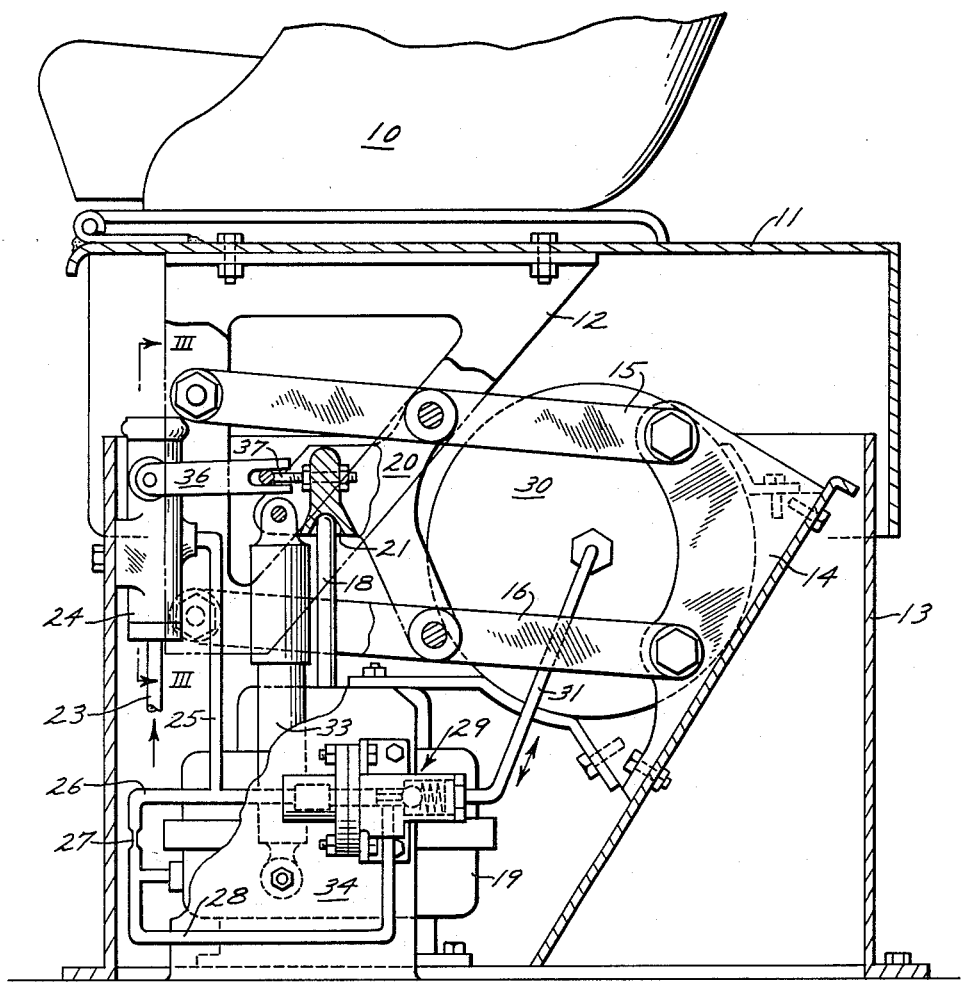
FIG. 1 is a view in side elevation with parts broken away and parts in section of a seat cushioning mechanism embodying the present invention.

Referring to the drawings and first to FIG. 1, a seat 10 is shown as mounted on a vertically movable housing member 11 to which are secured downwardly extending brackets 12. A housing member 13 fixed with respect to the floor of an operator's station or cab encloses fixed bracket members 14. The brackets 12 and 14 are arranged in spaced pairs, there being only one of each pair shown in the drawings, and are connected by parallel linkage including upper links 15 and lower links 16. This linkage permits substantially rectilinear vertical movement of the seat 10. Downward movement of the seat is limited by the piston rod 18 of a piston not shown in an air cylinder, sometimes referred to as an air spring, shown at 19. The details of construction of this air cylinder are shown in the above mentioned copending application but are unnecessary to an understanding of the present invention. Motion is transmitted from the parallel linkage to the piston of the air cylinder by a bracket 20 connected between sets of links and presenting a cup or socket as at 21 which embraces and bears upon the upper end of the piston rod 18. Air from a source not shown is introduced to the cylinder 19 through an inlet line 23, a leveling valve 24, a line 25, and a branch 26 with a restricting orifice 27. Air from the same source continues through a line 28 and a shutoff valve 29 which communicates with an accumulator tank 30 through a line 31. The accumulator tank 30 serves to augment the volume of fluid under pressure contained in the air cylinder 19 to produce the desired spring rate which may be further modified as by ordinary automotive shock absorbers, one of which is shown at 33 as connected between the bracket 20 and a rigid frame member 34.

Leveling valve 24 serves when an operator's weight is placed on the seat to open communication between the source and the air cylinder 19 as well as the accumulator 30 until sufficient pressure from the source has been introduced to support the operator's weight and cushion it. The leveling valve also is a venting valve which acts when the operator leaves the seat to vent pressure from the cylinder 19. The shutoff valve 29 acts almost simultaneously upon venting of pressure from cylinder 19 to prevent venting of pressure from the accumulator 30 which would result in a waste of pressurized fluid and would also direct fluid under pressure into the cylinder 19 forcing the seat 10 upwardly to its uppermost position until such time as all of the pressure was vented from the accumulator.

The construction and operation of the leveling valve which is shown at 24 in FIGS. 1 and 3 are set forth in the above mentioned copending application but a brief description will be an aid to an understanding of the present invention.

An actuating lever 36 of the valve is rotated upon upward and downward movement of the seat through connection with the bracket 20 by an adjustable link 37. The lever 36 as best shown in FIG. 3 is carried by a rotatable plug 38 with an eccentrically mounted pin 39 therein. When the seat moves downwardly under the weight of an operator, the lever 36 moves downwardly and the pin imparts downward movement to a plunger 40 in the valve. This unseats a valve disc 41 admitting fluid under pressure from the line 23 to the line 25 after the fluid has unseated a spring actuated check valve 42. When the pressure in the cylinder is sufficient to raise the seat with the weight of the operator to a desired level, upward movement of the valve lever 36 permits closing of the valve 41. Meanwhile the accumulator 30 has also been charged, if necessary, by fluid under pressure passing through lines 25, 26, valve 29 and line 31. Valve 24 also serves to vent the cylinder 19 when the operator leaves the seat. This is accomplished by slight upward movement of the seat and valve lever 36 which raises the plunger 40 and permits air from line 25 to vent through the hollow interior of the plunger and a rubber vent cap 44 at the top of the valve.

Figure 2:
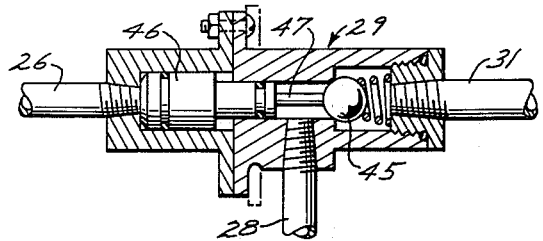
FIG. 2 is a sectional detail of a shutoff valve which, in accordance with the present invention, functions automatically.

Venting of the accumulator is prevented by the valve 29 which, as shown in FIG. 2, includes a spring closed check valve 45 and a plunger 46 having a stem 47 engageable with the valve ball to open it upon existence of pressure in the line 26. The check valve 45 admits air under pressure to the accumulator when necessary but acts as a shutoff valve to trap pressure in the accumulator when the air cylinder 19 is vented. This may be most readily understood from the schematic view of FIG. 4 wherein it is evident that pressure in line 25 which is charging the accumulator is also exerted against piston 47 to hold valve 45 in its open position. However when weight is relieved and the seat moves upwardly, valve 24 serves to vent pressure from cylinder 19 through restriction 27 and line 25. Because of the restriction 27, a pressure drop will occur in line 26 as well as line 25 which communicates with the chamber of piston 47 and the spring of ball check 45 as well as pressure within the accumulator 30 will urge the ball to its closed position.

I claim:

1. In a resilient vehicle seat mounting which includes a pneumatic cylinder and an accumulator communicating therewith for cushioning vertical movement of the seat, and leveling valve means opening to admit air from a source under pressure to the cylinder upon downward movement of the seat, closing upon upward movement to a given level, and venting pressure from the cylinder above said level, the improvement which comprises a valve controlling communication between the cylinder and the accumulator, and means to close said valve automatically when the cylinder is vented.

2. The combination of claim 1 with a spring for closing said valve and means actuated by pressure from the cylinder for holding the valve open.

3. The combination of claim 2 in which the means for holding the valve open includes a piston, and a conduit communicating pressure from the cylinder to actuate said piston.

4. The combination of claim 3 with a restriction in said conduit between the cylinder and the piston and a vent line in said conduit between the restriction and the piston, whereby opening of the vent line will effect an immediate pressure drop at the piston.

No references cited.

CLAUDE A. LE ROY, *Primary Examiner.*